United States Patent [19]
Lipsey et al.

[11] 3,736,590
[45] May 29, 1973

[54] LORAN-C RECEIVER

[75] Inventors: Elmer M. Lipsey, Annandale; Arnold Swagerty, Vienna, both of Va.

[73] Assignee: A-T-O Inc., Willoughby, Ohio

[22] Filed: May 12, 1971

[21] Appl. No.: 142,713

[52] U.S. Cl. ................................................343/103
[51] Int. Cl. ..................................................G01s 1/24
[58] Field of Search......................................343/103

[56] References Cited
UNITED STATES PATENTS
3,325,810  6/1967  Frank et al. .........................343/103

*Primary Examiner*—Samuel Feinberg
*Assistant Examiner*—Richard E. Berger
*Attorney*—Sughrue, Rothwell, Mion, Zinn & Macpeak

[57] ABSTRACT

A Loran-C receiver pulse groups from master and slave transmitting stations and locally generates precisely timed sample trigger pulses which occur in substantial coincidence with the third cycle of the carrier frequency of each received pulse. A cycle identifier compares the time of occurrence of the sample trigger pulses with the third cycle of the received pulses and provides an indication if the sample trigger pulses are not in coincidence with the third cycle of a carrier of the received pulses. A phase-locked loop in the receiver maintains the sample trigger pulses in phase with the carrier frequency of the received pulses. A phase shifter in the phase-locked loop is capable of achieving phase shift increments which are equal to a half cycle of the highest frequency locally generated in said receiver. The phase-locked loop also includes a repetition interval divider which is variably controlled to skip a predetermined number of counts to achieve a variation in the period of the repetition interval.

14 Claims, 10 Drawing Figures

Patented May 29, 1973 3,736,590

INVENTORS
ELMER M. LIPSEY
ARNOLD SWAGERTY

BY Sughrue, Rothwell, Mion,
Zinn & Macpeak

ATTORNEYS

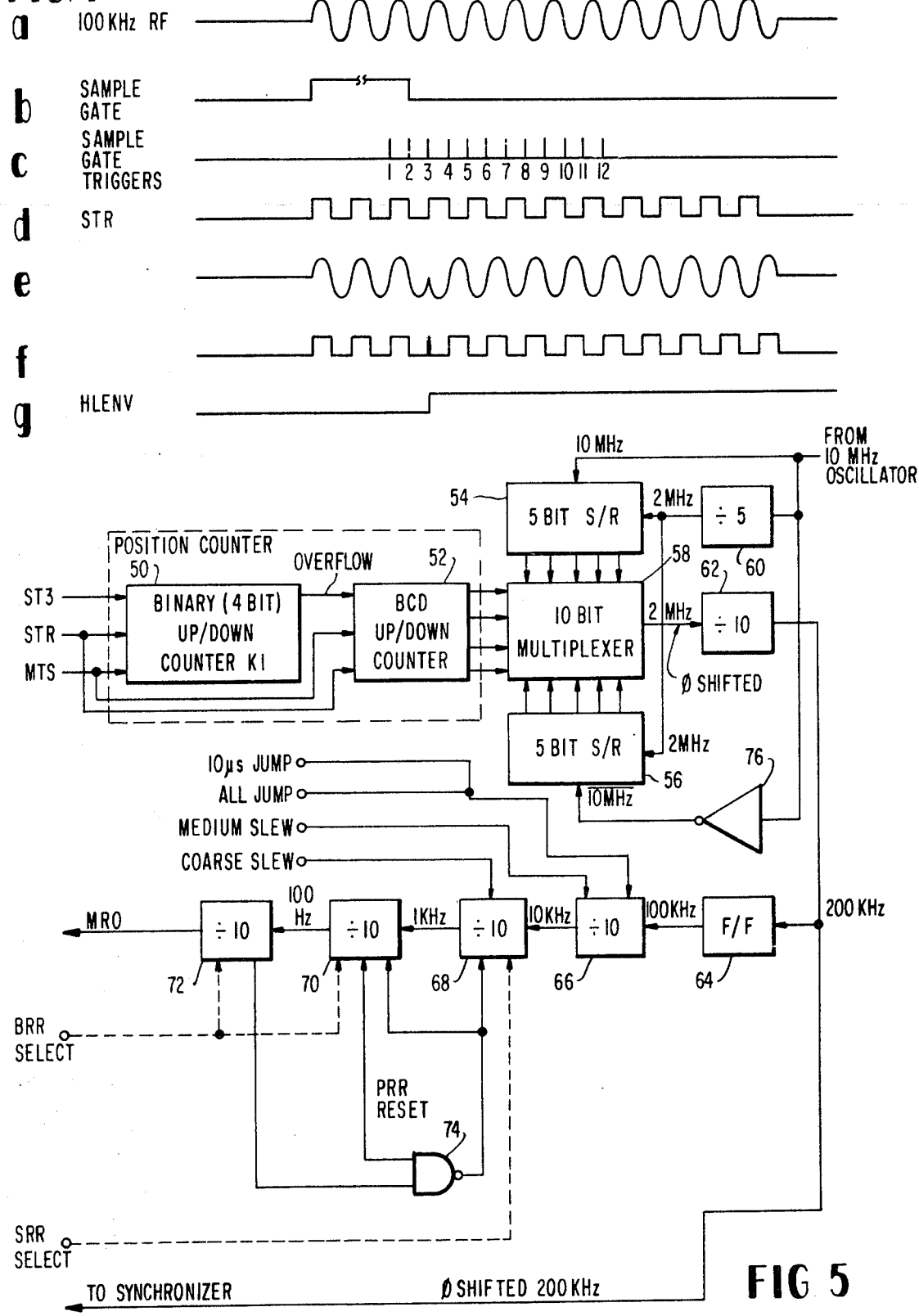

LORAN-C RECEIVER

BACKGROUND OF THE INVENTION

Loran systems are in fairly widespread use throughout portions of the world. Basically, Loran systems are pulsed hyperbolic navigation systems. Loran transmitters positioned at fixed locations transmit pulses at known repetition intervals. A Loran receiver on a vehicle, such as a ship, measures the time difference of arrival of the pulses from a pair of stations; the time difference of arrival determining a hyperbolic line of position on which the ship is located. The measure of the time difference of arrival of signals from a second pair of stations (one station is typically common to both pairs) enables the vehicle to determine a second hyperbolic line of position. The intersection of the two hyperbolic lines of position determines the accurate position of the vehicle. As is well known in the art, standard charts for all types of Loran systems are available, and once having the time difference information obtained from the Loran receiver, the position of the vehicle is determined by referring to the charts.

A particular type of Loran which is in widesread use is known as Loran-C. A Loran-C transmitting triad includes a master transmitting station and two slave transmitting stations which are synchronized to the master station. The stations operate at 100 KHz carrier frequency and at one of the fortyeight standard Loran-C repetition intervals. The repetition intervals of Loran-C systems are defined by a basic pulse repetition rate (BPRR) and a specific pulse repetition rate (SPRR). The BPRR and SPRR are given in the tables below and the actual repetition interval is the BPRR interval minus the SPRR interval.

| BPRR Designation | Repetition Intervals (Microseconds) |
|---|---|
| SS | 100,000 |
| SL | 80,000 |
| SH | 60,000 |
| S | 50,000 |
| L | 40,000 |
| H | 30,000 |
| SPRR Designation | Timing Period (Microseconds) |
| 0 | 0 |
| 1 | 100 |
| 2 | 200 |
| 3 | 300 |
| 4 | 400 |
| 5 | 500 |
| 6 | 600 |
| 7 | 700 |

As an example, if a particular Loran-C triad is operating at SL-3 (BPRR of 80,000 microseconds and SPRR of 300 microseconds) the actual repetition interval is 79,700 usec. Although this is known as the actual pulse repetition interval, it might be more properly designated as the pulse group repetition interval, since each transmitter transmits a group of pulses at the repetition intervals rather than a single pulse. Each transmitter transmits a group of eight pulses spaced 1,000 microseconds apart. The master station group also includes a ninth pulse which is separated from the eighth pulse by 2,000 usec. The purpose of sending out the ninth pulse from the master station is to identify that station. Each station sends out its respective group of pulses once each repetition interval and the slave stations are synchronized to the master station and timed so that they send out their respective groups at fixed times following the transmission of the group from the master station. The time separations are fixed so that none of the groups will overlap in the receiver provided the receiver is within the geographic area served by the Loran transmitters.

The relationship between the groups of pulses from a master station M and two slave stations A and B is illustrated in FIG. 1, and a typical Loran-C pulse is illustrated in FIG. 2. The pulse envelope is shown by dashed line 21 and the carrier by continuous line 23.

An important feature of a Loran-C receiver is its ability to provide precise time difference measurements. An error of measurement as low as 10 usec (a single wavelength of 100 KHz carrier) can result in an error of several miles in determining the location of the receiver. Loran-C receivers operate to locally generate precise timing pulses which are keyed to specific points on the received Loran pulses. One precise timing pulse is keyed to the received master pulses, a second precise timing pulse is keyed to the slave A received pulses and a third precise timing pulse is keyed to the slave B received pulses. A requirement for precise measurement is that the timing pulses for each of the three groups be accurately controlled and timed to coincide with identical points on the received pulses from the three transmitters. For example, if the precise timing pulse which is locked to the received master pulses is timed to occur at the 30 usec point of a received master pulse, accurate measurement requires that the timing pulse for the slave group be in coincidence with the 30 usec point of the slave pulses.

The respective timing pulses (hereinafter sometimes referred to as ST3), along with other sample pulses, are generated by three phase-locked loops which are, respectively, locked in phase to the 100 KHz received carriers of the master, slave A and slave B stations. In each phase-locked loop, a local oscillator output is phase-shifted and applied to a repetition interval divider. In order for the Loran-C receiver to be capable of operating with all 48 different Loran-C repetition intervals, the repetition interval divider must be versatile. The required versatility is the capability of recycling at each of the 48 standard Loran-C repetition intervals. The repetition interval divider provides reset pulses which are separated in time by the proper repetition interval and applied to a synchronizer means for generating the above-mentioned sample pulses, including the precision measurement pulse. The latter pulses are compared with the received 100 KHz received carrier and any phase difference is used to control the phase of the local oscillator output.

The synchronizer means generates a group of sample gates in response to each reset pulse. The sample gates are spaced relative to each other, the same as the pulses in a group of transmitted pulses. For each sample gate generated, the synchronizer means also generates a plurality of sample triggers spaced apart by 5 usec (one half cycle of the carrier).

Although the phase-loop locks the locally generated signal in phase with the received carrier, additional controls are necessary to properly position the sample gates in line with the received pulses. This is accomplished by use of a cathode ray oscilloscope having at least three sweep speeds and two traces. The received signals and the locally generated pulses are applied to the cathode ray tube and are superimposed so that the relative positions can be easily seen. The first sweep speed of the cathode ray oscilloscope is timed so that the pulse groups from all three transmitting stations can be displayed simultaneously. In operation, when the initial sweep is used, the master group is recognized by its ninth pulse and the oscilloscope controls are varied to place the master group in a position on the screen to the left of the slave A and slave B groups. The second sweep speed is faster than the first and allows display of one complete group of received pulses and one group of sample gates. The operator then aligns the sample gates with the received pulses by energizing control inputs to the repetition interval divider which add or subrract counting inputs to the divider. This has the effect of shifting the locally generated repetition interval and the locally generated sample gates to the right or to the left. It will be noted that this procedure is carried out separately for the master and both slave groups of pulses.

The third sweep speed is sufficiently rapid so that only a single pulse is displayed with each cycle being relatively clearly distinguished. A single sampler trigger, ST3, which has been coarsely positioned during the above-mentioned step to coincide with the received pulse is displayed superimposed on the received pulse. Control means are again energized to finely vary the position of ST3 so that it coincides substantially exactly with a particular point on the received pulse. In the example given herein, this particular point is the 30 usec point. The same procedure is followed for a pulse from slave A and for a pulse from slave B. The result, following the operation described above, is that the locally generated ST3 pulses from the master phase locked loop are in substantial time coincidence with the 30 usec points of the received master pulses; the locally generated ST3 pulses from the slave A phase-locked loop are in time coincidence with the 30 usec points of the slave A received pulses; and the locally generated ST3 pulses from the slave B phase-locked loop are in time coincidence with the 30 usec points of the received slave B pulses. A corresponding ST3 pulse from each of the groups is then used for accurate time difference measurements. The operation described above is typically only performed during acquisition when the receiver is first turned on or when the vehicle carrying the receiver first moves into the region serviced by the particular Loran transmitters of interest. Since the vehicle is normally moving, the sample pulses, which are locked in phase with the previous received pulses will be slightly out of phase with the presently received pulses. However, the phase lock will serve to vary the time or phase of the locally generated sample pulses to keep them in phase with the received pulses. Despite the phase lock feature of the loop, it is possible that the ST3 pulses, although maintained in phase with the received 100 KHz carrier, will effectively jump a full cycle of the 100 KHz carrier so that they will be in substantial coincidence with the 20 usec point or the 40 usec point of the received pulses. It will be noted that the 100 KHz carrier has a wavelength of 10 usec and therefore the 30 usec point is also referred to as the third cycle.

In order to insure that the ST3 pulses remain in substantial coincidence with the third cycle, a cycle identifier is provided in the receiver. They key to cycle identification is to electronically define an exact point on each pulse and to compare the position of ST3 with that point. One such prior art method, referred to as envelope detection, operates as follows: the 100 KHz carrier frequency is removed in a demodulation circuit and the resulting envelope is delayed, inverted, and subtracted from the envelope undelayed. With the delay set at a controlled point, the resultant signal may be made to have a zero cross-over at some precisely defined point, e.g., 30 usec, from the beginning of the pulse. Since a single cross-over is fairly easily detectable, it is position compared with the ST3 pulse. The problem with the latter system is that the envelope detector requires that a locally generated 100 KHz reference signal be mixed with the received pulses by applying both to a diode bridge rectifier. The internally generated 100 KHz signal has a tendency to back-up into the radio frequency amplifier or pass through the diode bridge causing measurement errors. Thus, video detection of the envelope by this particular prior art method is considered unsatisfactory.

Another method, known as radio frequency strobing, is carried out by separating the received carrier into two channels, delaying it in one channel, and adding it in a resistive adder to the undelayed carrier in the other channel. The output of the adder is a 100 KHz signal having 180° phase reversal at one point. By controlling the amount of delay in the first channel and the resistance of the adder, the point of phase reversal can be accurately controlled. For example, the point of phase reversal may occur exactly at the third cycle of the received pulse. The problem with the latter described system is that the signal from the adder is cyclic and contains many cross-overs. Thus, complex circuitry is necessary to determine whether the sample pulse is in advance of or lagging behind the phase reversal point.

As mentioned above, the phase locked loop also includes a repetition interval divider and in order for the receiver to be capable of receiving all standard Loran-C repetition rates, the repetition interval divider must be capable of generating output pulses at all of the 48 Loran-C repetition rates. This versatility has typically been accomplished by providing a divider which receives an input pulse every microsecond and recycles after every 100,000 input pulses. Each time the divider recycles to zero a reset output pulse is generated. In order to provide a repetition interval of less than 100,000 microseconds, decoding means connected to the proper stages of the counter detect when the divider reaches a count corresponding to the desired standard Loran-C repetition interval. When the latter occurs all stages in the divider are forceably reset to zero. The problem encountered with the latter type of repetition interval divider is that the output pulses, which are used to define the repetition interval and to generate the sample gates and sample triggers, are slightly noisy due to the delays inherent in detecting the condition of the divider stages. The noise is manifested by a variation in exact position of the output pulses and therefore can result in an inaccuracy in the time difference measurement.

SUMMARY OF THE INVENTION

The Loran-C receiver includes a cycle identifier which indicates when the sample trigger has jumped from the third cycle to a different cycle of the received pulse. Each received pulse is applied directly to one input of an adder and through a delay means to a second input of the adder. The output from the adder, a 100 KHz signal with phase reversal at the desired cycle, is hard limited and applied as one input to a phase detector or modulo-2 adder. The other input to the modulo-2 adder is the received pulse after being hard limited. The bi-level output from the modulo-2 adder steers an up-down counter which receives an equal number of impulses before and after the generation of the sample triggers. An overflow indicates that the sample trigger is out of coincidence with the desired cycle of the received pulses and means are provided for indicating this condition.

The Loran receiver includes a phase shifter in the phase-locked loop which achieves phase shift increments of less than the cycle time of the highest frequency which is locally generated in the receiver. The local oscillator signal shifts a pair of shift registers once each cycle with each of the shift registers being shifted on a different half cycle of the locally generated frequency. Outputs are taken from each stage of both shift registers and applied to a multiplexer means for selecting one of the outputs in accordance with the phase shift desired. Each shift register provides phase shift increments equal to a full cycle of the locally generated frequency but due to the interlacing of both shift registers, phase shift increments of one half cycle of the local oscillator period are obtained.

The phase locked loop of the receiver includes a repetition interval divider which is capable of cycling at any of the 48 standard Loran-C repetition intervals. Coding and presetting means are provided for detecting when the repetition interval divider reaches a count corresponding to 1,000 usec less than the selected BPRR interval and for presetting the repetition interval counter to a count sufficiently below the full capacity of the repetition interval divider so that the desired cycle time is achieved.

BRIEF DESCRIPTION OF THE DRAWINGS

FIG. 4 is a wave form diagram illustrating wave forms which occur in the Loran-C receiver.

FIG. 5 is a block diagram of the phase detector, phase shifter, and repetition interval divider of the Loran-C receiver.

DETAILED DESCRIPTION OF THE PREFERRED EMBODIMENTS

Figure 1:
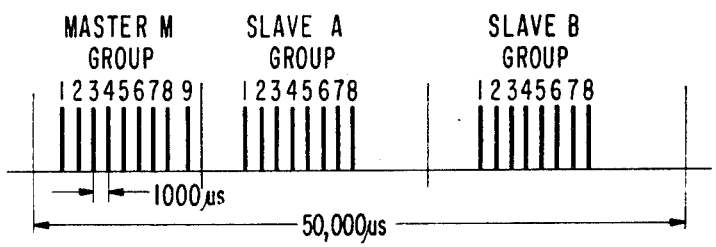
FIG. 1 is a timing diagram illustrating the relationship of pulses received from a master transmitter and a pair of slave transmitters.
Figure 3:
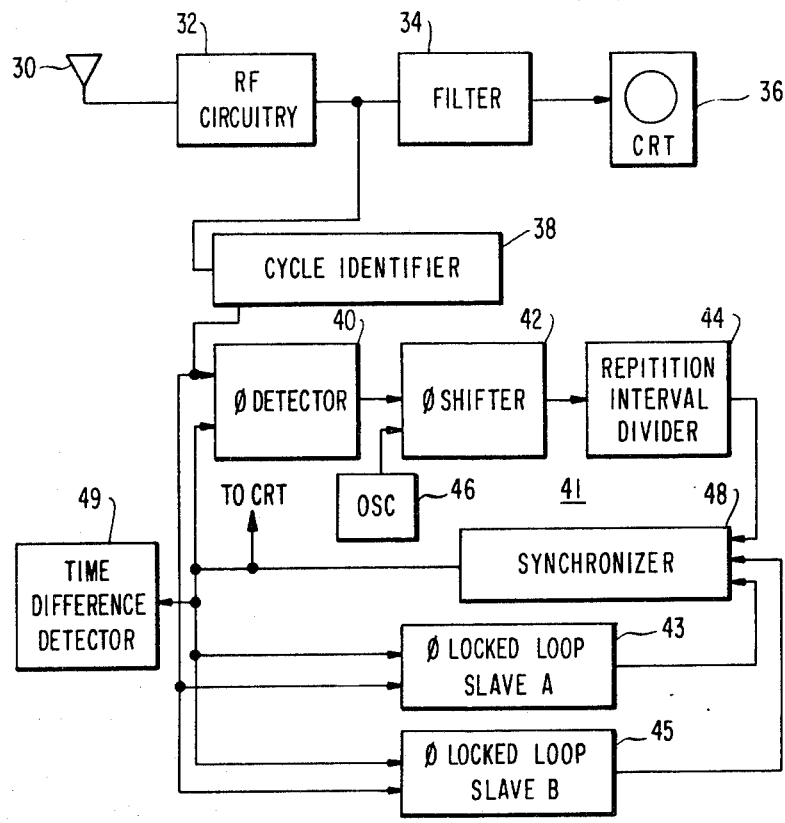
FIG. 3 is a general block diagram of a Loran-C receiver.

Portions of a Loran-C receiver necessary for an understanding of the present invention are shown in block diagram form in FIG. 3. The groups of pulses from the master, slave A, and slave B stations, as shown in FIG. 1, are received by antenna 30 and passed through the r.f. circuitry 32, filter 34, and applied to a cathode ray tube 36. As explained above in the background section, the cathode ray tube is provided with three sweep speeds and displays locally generated pulses superimposed on received pulses. At the highest sweep speed the cathode ray tube displays the groups of pulses from all three transmitting stations. The appearance of the display of all three groups simultaneously is similar to that shown in FIG. 1. Also, the locally generated sample gates will be displayed superimposed on the display of the latter groups of pulses.

The received pulses from the output of r.f. circuitry 32 are applied to a cycle identifier 38 which will be explained in more detail hereafter. Generally, the cycle identifier provides an indication of whether or not the locally generated sample triggers are in substantial time coincidence with the 30 usec point of each of the received pulses. It will be noted that the cycle identifier may be selectively controlled by a manual switch to operate on the pulses from any of the three transmitters.

Figure 2:
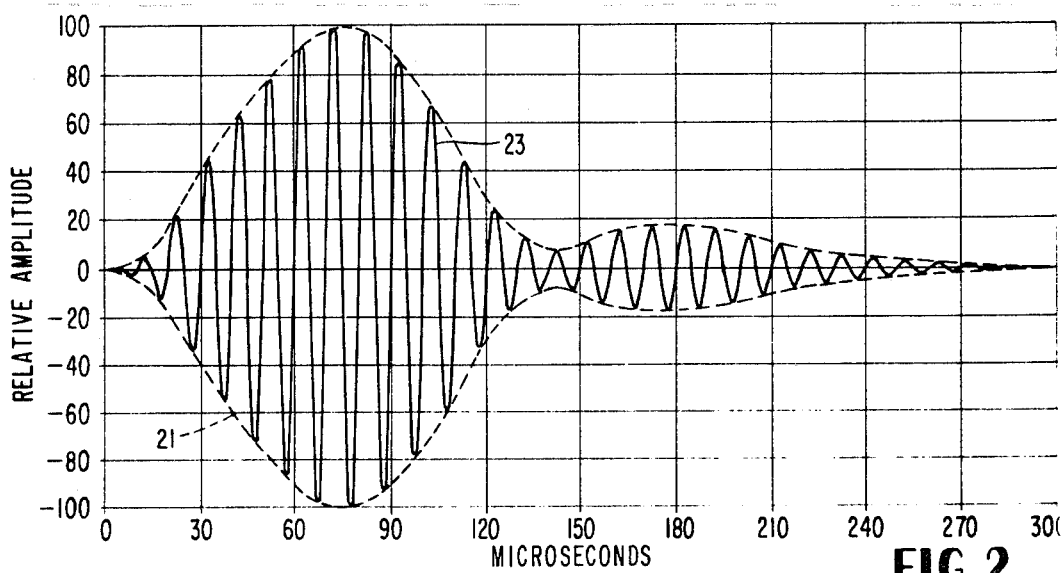
FIG. 2 illustrates a single Loran-C pulse.

The cycle identifier, as will be explained below, includes a hard limiter which hard limits the 100 KHz carrier of the received pulses, thereby resulting in a 100 KHz square wave hereinafter designated as STR. The waveform STR is illustrated as waveform (d) in FIG. 4. It will be noted, that in FIG. 4, waveform (a) represents the 100 KHz carrier for a single received pulse. It is shown in FIG. 4 as being unmodulated but in actual practice it is amplitude modulated by the envelope as shown in FIG. 2.

The waveform STR is applied to a plurality of phase-locked loops, 41, 43 and 45. Typically, the Loran-C receiver will have three phase-locked loops; one corresponding to the master station, and one corresponding to each of the slave stations. Since all three phase-locked loops are identical, only one will be described in connection with FIG. 3 and for the purpose of discussion it will be assumed that the particular phase-locked loop described herein is the one which generates the sample gates and the sample triggers corresponding to the received master pulses.

The phase-locked loop 41 broadly comprises a phase detector 40, a phase shifter 42, a local oscillator 46, a repetition interval divider 44, and a synchronizer 48. As will be explained in more detail hereafter, the synchronizer 48 is shared by and forms a part of all three phase-locked loops. Considering only the master phase-locked loop 41, the synchronizer receives master reset pulses (MRO) which are separated in time by the repetition interval of the transmitters, and a 200 KHz square wave signal which is in phase with the received master carrier. In response to each master reset pulse (MRO), the synchronizer provides a plurality of sample gates and sample gate triggers. There are 10 sample gates spaced 1,000 usec apart. It will be recalled from the above discussion that the transmitted pulses in each group are also spaced 1,000 usec apart. During initial acquisition, when the cathode ray tube 36 is operating at its highest sweep speed the sample gates appear on the lower trace. They are coarsely aligned with the received pulses displayed on the upper trace by advancing or delaying the reset pulse MRO. The latter is accomplished by adding or skipping counts in the repetition interval divider 44.

For each sample gate which the synchronizer 48 generates, it also generates 12 sample gate triggers which are 2.5 usec in width and separated by 5 usec. The sample gate triggers are referred to as $ST_1$ through $ST_{12}$, in order of occurrence. In the particular example described herein, the trigger $ST_3$ is used as the precision measuring pulse. During the acquisition phase of operation, when the cathode ray tube is operating at its slowest sweep and displaying a single received pulse on its upper trace, a single $ST_3$ trigger appears on the lower trace. As explained above in the background section, $ST_3$ is aligned with the third cycle, or 30 usec point, of the received pulse by advancing or retarding the count in the repetition interval divider 44.

The synchronizer also generates non-overlapping time sharing pulses, MTS, ATS, and BTS, which represent, respectively, the time of reception of the pulses from the master, slave A, and slave B stations. The time sharing pulses are applied to the three-phase lock loops to insure that only the proper received pulses enter the phase locked loops. They are also applied to the cycle identifier 38 along with a selection input for the purpose of selecting the group of pulses to be checked in the cycle identifier 38.

The 200 KHz signal applied to synchronizer 48 is maintained in phase with the 100 KHz carrier of the master pulses due to the operation of the phase detector 40 and phase shifter 42. The sample trigger, $ST_3$, which is in phase with the 200 KHz input to the synchronizer 48 is compared in phase detector 40 with the hard limited carrier STR. The phase detector 40 controls the phase shifter 42 which varies the phase of a local high frequency signal from oscillator 46. The variation of phase is in a direction to bring $ST_3$ in phase with STR. In the specific example, which will be described in more detail below, the local oscillator 46 provides a 10 MHz signal which is reduced to a 2 MHz signal in the phase shifter 42. The 2 MHz signal is applied to a decade counter, which may be a part of repetition interval divider 44, resulting in the 200 KHz signal applied to the synchronizer 48. The synchronizer output is applied to a time difference detector circuit 49 which operates to measure the time difference between the first occurring $ST_3$ triggers during timer MTS and ATS or during timer MTS and BTS.

A block diagram of the phase detector, phase shifter, and repetition interval divider is illustrated in FIG. 5.

As shown in FIG. 5, the phase detector comprises a 4 bit binary up-down counter 50 and a binary coded decimal up-down counter 52. The phase shifter receives its input from a 10 MHz oscillator, not shown, and comprises a pair of 5 bit shift registers 54 and 56, a frequency divider 60, and a 10 bit multiplexer 58. The divider or decade counter 62 may be considered as a part of the phase shifter or as a part of the repetition interval divider. The repetition interval divider comprises flip-flop 64, decade counters 66, 68, 70 and 72, and reset circuitry which is generally illustrated by the logic gate 74. The phase shift circuitry is designed to achieve a phase shift in increments as small as 0.05 usec. Since a 2 MHz waveform has a cycle wavelength of 0.5 usec, the desired incremental phase shift is accomplished by effectively dividing each cycle of a 2 MHz into ten parts, with adjacent parts being separated by 0.05 usec. The 10 MHz signal from the local oscillator is applied to the divider circuit 60 resulting in a 2 MHz output which loads a one bit into shift registers 54 and 56 once each 0.5 usec. Both of the shift registers 54 and 56 are shifted by a 10 MHz signal, thereby accomplishing a one position shift every 0.1 usec and achieving a full five-position shift every 0.5 usec, corresponding to a full cycle of the 2 MHz signal. However, shift register 54 is shifted by the 10 MHz signal directly from the local oscillator whereas shift register 56 is shifted by the 10 MHz signal inverted. Inversion occurs in the inverter 76. With output lines connected to each stage of the shift registers 54 and 56, as shown, the result is ten separate phases of a 2 MHz signal appearing on the respective output lines with phase separations being equal to 0.05 usec. The 10 phases of the 2 MHz signal are applied to a 10-bit multiplexer 58 which selects one of the phases (by selecting one of the 10 lines) in accordance with the value of the binary-coded decimal input applied thereto. The selected phase appears at the output of the 10-bit multiplexer and is divided by 10 in decade counter 62 resulting in a phase shifted 200 KHz signal which is applied to the synchronizer as described above.

Since the 10 bit multiplexer 58 is controlled by the value of the binary coded decimal input applied thereto, and since that input is taken from the BCD up-down counter 52, it can be easily seen that each time the counter 52 increments or decrements one count, the 200 KHz signal applied to the synchronizer is shifted in phase by 0.05 usec.

Phase detection is accomplished by applying STR to the steering input of the binary up-down counter 50 and ST3 to the count input of counter 50. It will also be noted that the master time sharing pulse MTS is required in order for the phase detector to operate. If ST3 is in phase with STR the binary counter 50 will alternately count up and down thereby producing no overflow pulses. Since overflow pulses increment or decrement the BCD counter 52, the lack of any overflow means that the BCD counter 52 will be neither incremented nor decremented and the phase of the 200 KHz signal will not change. However, if ST3 is out of phase with STR, counter 50 will count in one direction more than the opposite direction and will overflow at a count of plus or minus 16. The overflow will increment or decrement BCD counter 52 depending upon the level of the steering signal STR.

The 200 KHz output from the phase shifter is also applied to the repetition interval divider. As mentioned above, the divider operates to provide master reset pulses, MRO, at the repetition interval of the transmitters. As will be apparent, the decade counter 66 advances one count every 10 usec, the decade counter 68 advances one count every 100 usec, the decade counter 70 advances one count every 1,000 usec, and the decade counter 72 advances one count every 10,000 usec. The counter has a total count capacity or recycling period of 100,000 usec which corresponds to tthe largest repetition interval for any Loran-C transmitting station. However, as described above, the receiver must be capable of generating repetition periods, corresponding to all 48 possible Loran-C repetition periods. This has been accomplished in the past by detecting when the repetition interval divider reaches a count corresponding to the desired repetition interval and resetting all stages to zero. However, as explained above, this results in a noisy overflow output pulse and affects the accuracy of measurement.

In accordance with the repetition interval divider disclosed herein, conventional detection means are provided to detect when the divider reaches a count which corresponds to 1,000 usec less than the BPRR. When this occurs, the last two decades 70 and 72 are preset to the value 9, representing 99,000 usec, and the second decade counter 68 is preset in accordance with the specific pulse repetition rate designation.

Figure 6:
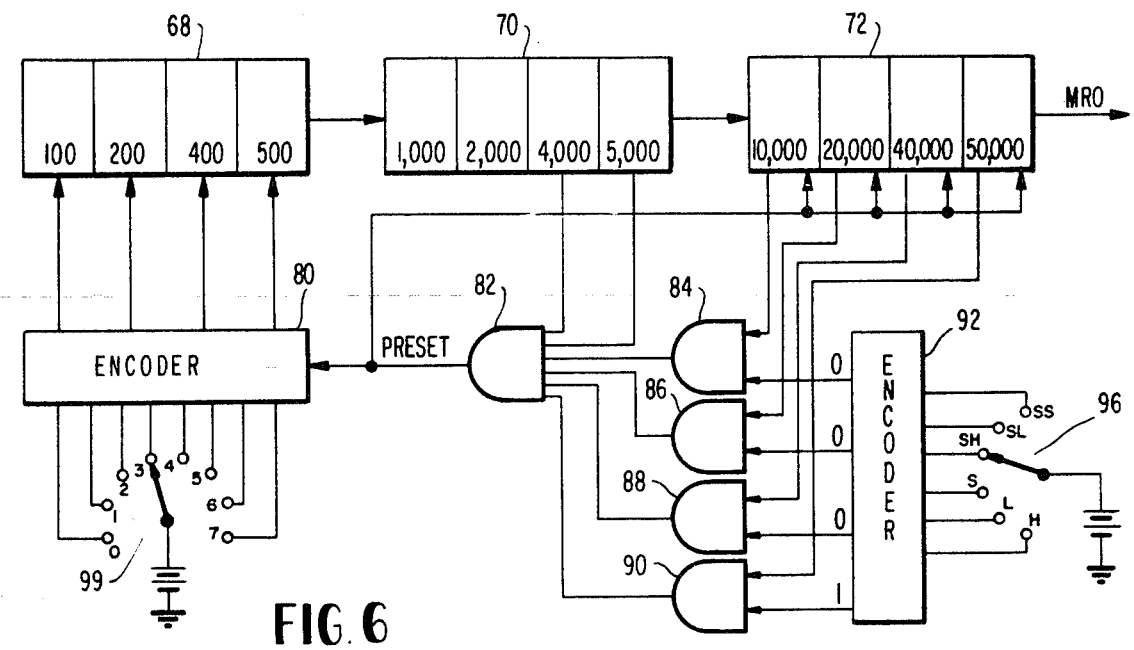
FIG. 6 is a more detailed block diagram of a portion of the repetition interval divider of the Loran-C receiver.

A specific example will be described in connection with FIG. 6 which illustrates the last three decades, 68, 70 and 72, of the repetition interval counter, and the resetting logic. In the particular example described, it will be assumed that the BPRR is SH (60,000 usec) and the SPRR is three (300 usec). In this example, the actual repetition interval is 59,700 usec. The logic operates to detect when the repetition interval divider reaches a count of 59,000 usec. When that occurs, the divider is jumped to a count of 99,300 usec. The counter then continues to count for 700 more usec before recycling. The result is that the period of the counter is 59,700 usec and the overflow output pulse from the counter occurs during normal recycling of the counter rather than during forced resetting of the counter. As shown in FIG. 6, a BPRR switch 96 is selectively connected to the terminal corresponding to the selected BPRR. An encoder 92 operates in the well known manner to provide a 4-bit output code for each of the energized input lines. For example, with the switch 96 connected as shown to the SH terminal, the 4-bit output code, reading from top to bottom, would be 0001. When the decade counter 72 reaches a count corresponding to 50,000 usec. it will also have a code which is the same as that provided by the encoder 92. When the latter occurs, all of the compare circuits 84, 86, 88 and 90 will be energized, thereby providing energizing level inputs to the logical AND circuitry 82. When a count in decade counter 70 corresponding to 9,000 usec is reached, the logical AND circuitry 82 will be fully energized, thereby producing a preset output signal. In the example given herein, the preset output signal will be generated as soon as the repetition interval divider reaches a count of 59,000 usec.

The preset signal zeros the first and second stages of decade counter 72 and inserts a "1" into the last two stages of decade counter 72. This results in decade counter 72 registering a count of 90,000 usec. Decade counter 70 is unaffected by the preset signal and therefore retains a count corresponding to 9,000 usec. The decade counter 68, which will be zero at the time the preset signal is generated, is preset to a count corresponding to the selected SPRR. An SPRR switch 94 is connected to the terminal representing the selected SPRR. Each of the eight SPRR terminals is connected to an encoder 80, which provides four bit output corresponding to the selected SPRR. The encoder 80 is energized when the preset signal occurs. For the particular example shown, the preset signal will energize encoder 80 to insert "1" bits into the first and second stages of decade counter 68, thereby causing that decade to register a count corresponding to 300 usec. The overall result is a count corresponding to 99,300 usec. Following the presetting of the divider to the count of 99,300, the divider will count for 700 more microseconds, at which time it will recycle to 000,000 and produce an overflow or reset pulse MRO.

Figure 7:
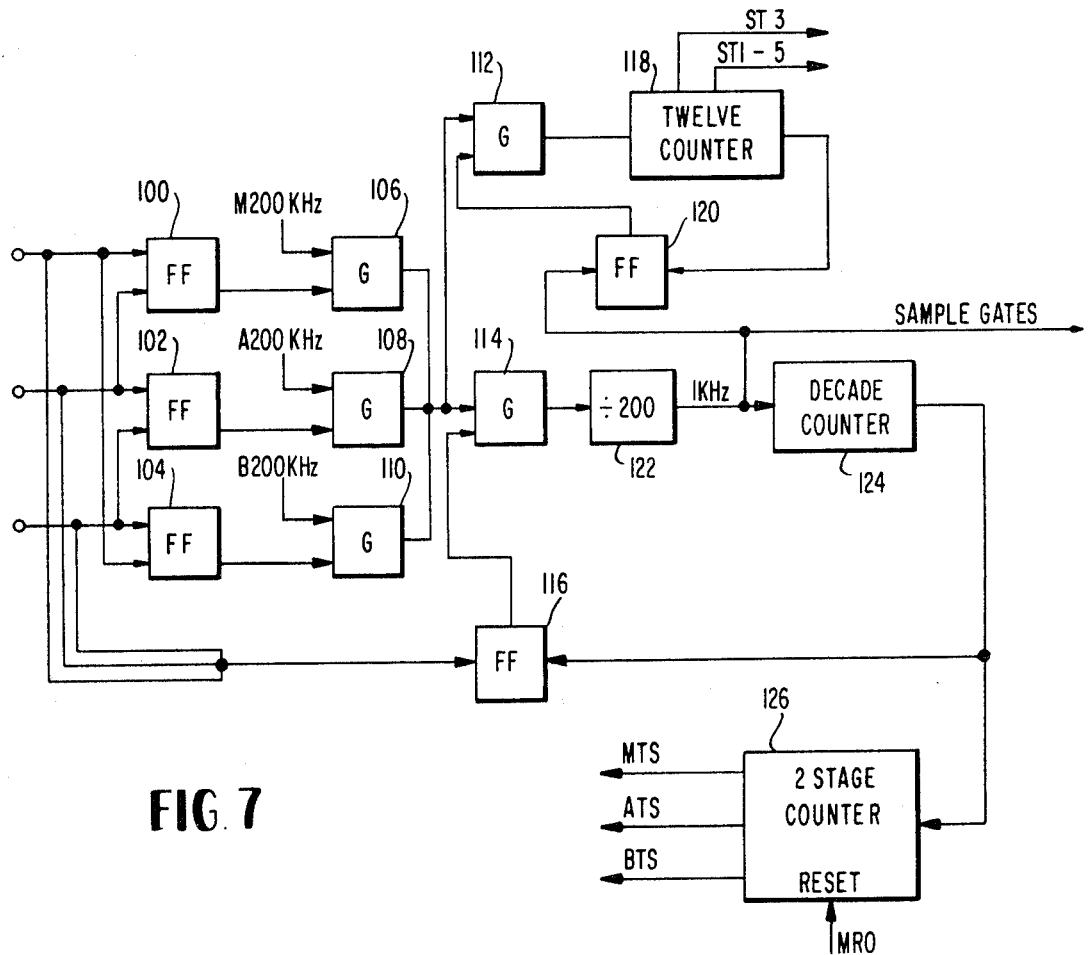
FIG. 7 is a block diagram of the synchronizer which forms a part of the phase lock loop in the Loran-C receiver.

A functional block diagram of the synchronizer is illustrated in FIG. 7. As mentioned above in connection with FIG. 3, the synchronizer is shared by all phase-locked loops and operates to generate the sample gates, sample triggers, and time sharing pulses MTS, ATS and BTS. The inputs to the synchronizer are the reset pulses MRO, ARO and BRO, from the repetition interval counters in the three phase-locked loops, and the phase controlled 200 KHz signals. The three reset pulses are applied respectively to flip-flops 100, 102 and 104, to set those flip-flops and open, respectively, gates 106, 108, and 110. Thus, as can be seen from the logic in FIG. 7, in response to the reset pulse from any of the loops, the phase-controlled 200 KHz signal from the same loop is passed to the inputs of gating means 112 and 114. Any of the three reset pulses operates to set the flip-flop 116 thereby opening gating means 114 to pass the 200 KHz signal to a divide by 200 counter 122. The overflow pulses from the counter 122 are separated by 1,000 usec and constitute the sample gates referred to above. Ten sample gates are counted in decade counter 124 and the overflow from decade counter 124 resets flip-flop 116 thereby preventing further passage of the 200 KHz signal through gate 114 until such time as a subsequent MRO, ARO or BRO pulse occurs. Each sample gate from the counter 122 controls the generation of the sample gate triggers by setting a flip-flop 120 which activates gating means 112 to pass the 200 KHz signal therethrough to a counter 118 which overflows after 12 counts. The overflow from counter 118 resets flip-flop 120 and prevents further passage of the 200 KHz signal through gating means 112 until such time as a subsequent sample gate appears at the output of counter 122. Since the 200 KHz square wave has a cycle time of 5 usec, the positive portion of the square wave which passes through gating means 112 represents the sample gate triggers $ST_1$ through $ST_{12}$, with each pulse having a 2.5 usec duration and being separated from adjacent pulses by 5 usec. The sample gate trigger $ST_3$ and $ST_1$ through $ST_5$ may be picked off by conventional means from the proper stages of counter 118.

The synchronizer also generates the time sharing pulses MTS, ATS, and BTS. This is accomplished by resetting a two-stage counter 126 to the count of 00 in response to the input MRO. The 00 condition of the two-stage counter 126 is recognized by conventional means as the MTS time sharing pulse. The counting input to the counter is provided by the overflow from decade counter 124, and conventional recognition means recognize a count of one in the counter 126 as representing the time sharing pulse ATS and a count of two in the counter 126 as representing the time sharing pulse BTS.

Figure 8:
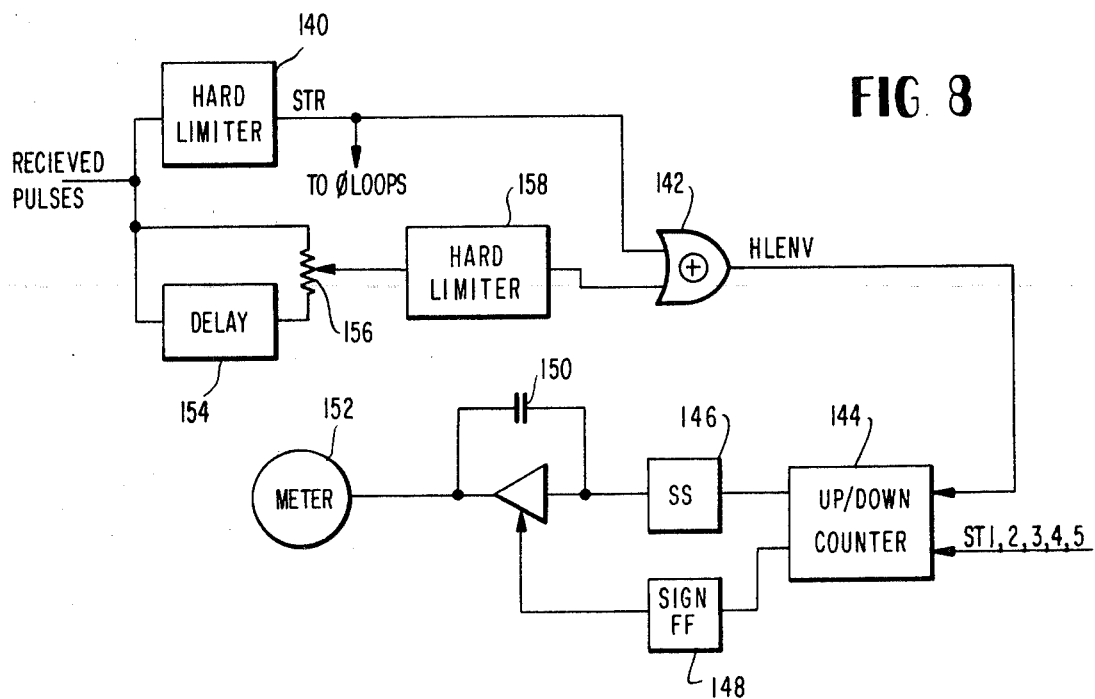
FIG. 8 is a block diagram of the cycle identifier which is a part of the Loran-C receiver.
Figure 9:
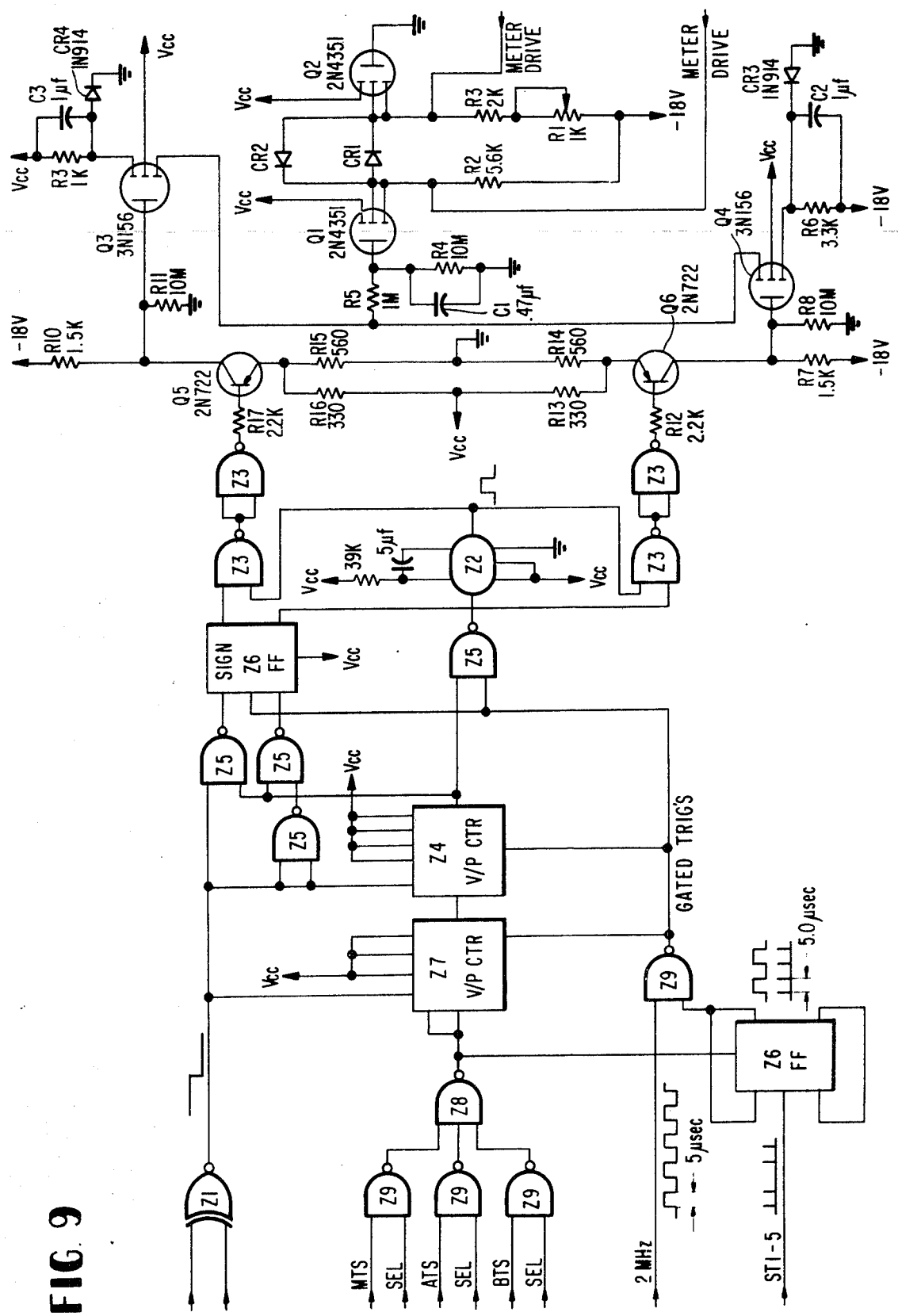
FIG. 9 is a detailed partially block diagram and partially schematic diagram of the cycle identifier.

The cycle identifier of the present invention will be described in connection with FIGS. 8 and 9. FIG. 8 is a functional block diagram of the cycle identifier and FIG. 9 is a detailed partially block diagram and partially schematic diagram of the cycle identifier. Referring to FIG. 8, the received pulses are applied to a conventional hard limiter 140 resulting in the output waveform STR which is illustrated as waveform (d) in FIG. 4. The received pulses are also applied directly to one side of resistive adder 156 and via delay means 154 to the other side of resistive delay means 156. The resultant output from adder 156 is illustrated in waveform (e) of FIG. 4 and is a 100 KHz signal having one point in which complete phase reversal occurs. By careful adjustment of delay means 154 and the resistance in adder 156, the point of phase reversal can be made to occur at substantially any desired point. In the preferred embodiment as described herein the desired point of phase reversal is the 30 usec point, i.e., at th end of the third full cycle of the received pulse as illustrated in FIG. 4. The output from adder 156 is hard limited in a conventional hard limiter 158 and applied as the second input to an exclusive OR circuit 142. The output from hard limiter 158 is illustrated as waveforms (f) in FIG. 4 and the output from the exclusive/OR circuit 142 is illustrated as waveforms (g) in FIG. 4. The waveform HLENV, which stands for hard limited envelope, is applied to the steering control input of an up-down counter 144. The counter counts in accordance with the sample gate triggers $ST_1$, $ST_2$, $ST_3$, $ST_4$ and $ST_5$. If the $ST_3$ sample gate trigger is properly in coincidence with the 30 usec point of the received pulse, the counter will count up and down an equal number of times resulting in no overflow. However, if the trigger $ST_3$ has moved out of coincidence with the 30 usec point of the received pulse an overflow from counter 144 will trigger a single shot 146 whose output is integrated and held by integrator 150. The polarity of the integrated signal is controlled by a sign flip-flop 148 which detects the direction of overflow from counter 144 and controls the direction of integration. The integrated value is applied to a meter 152 which will be at a substantially null position when $ST_3$ is in coincidence with the 30 usec point but will move to the right or left respectively if the pulse $ST_3$ moves to the right or left of the 30 usec point of the received pulse. Whenever the meter indicates that the sample gate trigger $ST_3$ has moved off the 30 usec point, this may be corrected by energizing a control input to the repetition interval divider to either add or subtract a few counts from that divider thereby shifting the entire locally generated repetition interval and consequently the sample gate triggers either to the right or to the left. One of the advantages of the cycle identifier disclosed herein is that it will allow the use of relatively simple detection circuitry for detecting whether the $ST_3$ pulse is off to the right or the left of the 30 usec point.

The details of the cycle identifier, with the exception of the hard limiters, the delay circuit and the adder, are illustrated in FIG. 9 wherein conventional negative logic symbols are used. As mentioned above the cycle identifier is used individually for the master, slave A, and slave B groups of pulses. Selection is manual and is accomplished by energizing one of the three select inputs to the respective gates Z9. The other inputs to the three Z9 gates are respectively MTS, ATS and BTS. Thus, if the master pulses are to be examined for proper cycle identification, the select input to the upper gate Z9 is energized. As a result, the output from gate Z8 can only go high during the occurrence of MTS, and since a high output from Z8 enables both decades of the up-down counter Z7 and Z4, that ccounter only operates during the period defined by the time sharing pulse MTS. Gate Z1 corresponds to the exclusive OR circuit 142 of FIG. 8 and the output is used as the steering control input to the up-down counter Z7 -Z4.

For each group of sample gate triggers, $ST_1$, $ST_2$, $ST_4$ and $ST_5$, the up-down counter actually receives 20 count impulses. This is accomplished by applying the sample gate triggers to a flip-flop Z6 whose output in turn opens gate Z9 to pass a 2 MHz signal. The result is that between $ST_1$ and $ST_2$, a 5 usec period, gate Z9 is opened to pass 10 count impulses to the up-down counter. The same thing occurs during the 5 usec period between $ST_4$ and $ST_5$. If $ST_3$ is not properly in coincidence with the 30 usec point of the received pulse, the up-down counter counts more in one direction than the other eventually resulting in an overflow pulse at its output. The direction of overflow is detected by a sign flip-flop Z6 in combination with logic Z5. The overflow pulse also passes through a single shot circuit Z2 whose output is passed through one of the Z3 gating means depending upon the sign of the overflow, to the respective transistor switching circuit for transistor Q5 or Q6. As can be readily seen by anyone of ordinary skill in the art, if transistor Q5 is turned on, capacitor C1 will be charged in one direction whereas if transistor Q6 is turned on capacitor C1 will be charged in the other direction. The voltage stored on capacitor C1 is applied to a conventional meter drive circuit to deflect the meter indicator in one or the other direction.

Figure 10:
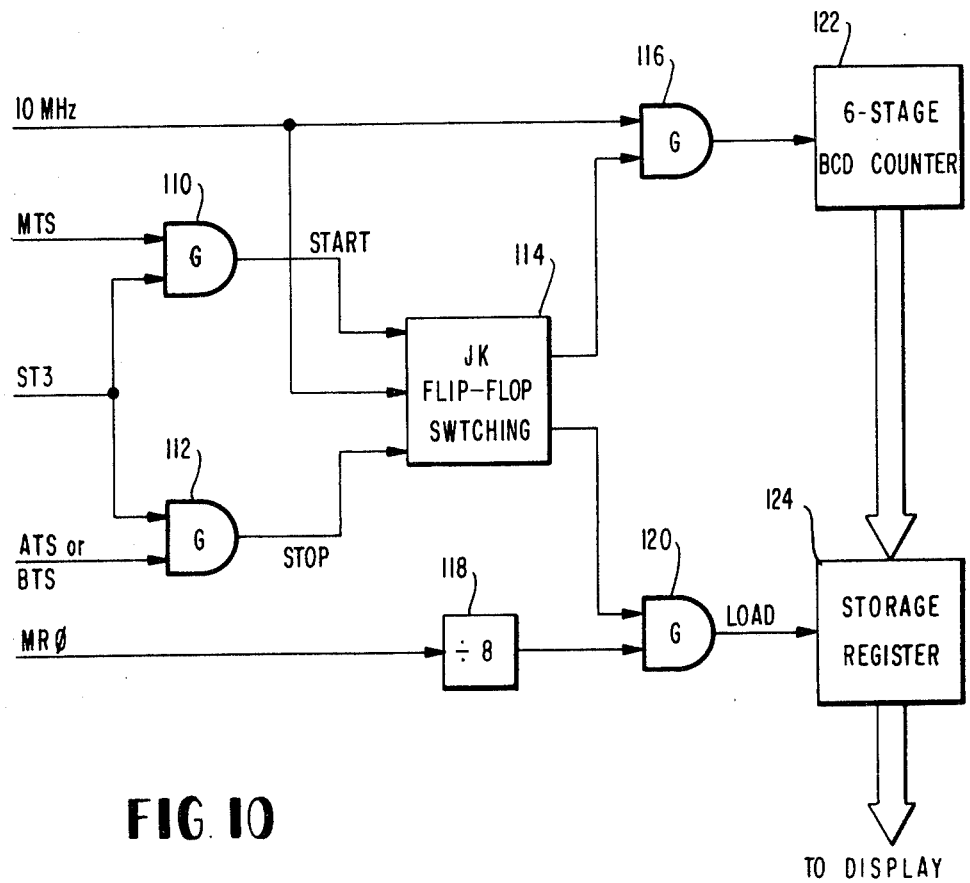
FIG. 10 is a block diagram of a time difference detector.

A logic block diagram of the time difference detector 49 of FIG. 3 is illustrated in FIG. 10. The first $ST_3$ trigger occurring during the MTS time period passes through gate 110 and places JK flip-flop 114 in the start condition. This condition enables gate 116 to pass the locally generated 10 MHz clock pulses to a six-stage BCD counter 122. The BCD counter 122 accumulates the clock pulses until the JK flip-flop 114 is placed in the stop condition by the first $ST_3$ pulse which occurs during the time period ATS or BTS, depending upon which time difference is being measured. The MRO reset pulses are applied to a divide by eight circuit 118 whose output is in turn applied through gate 120 to the storage register 124. When the storage register 124 is enabled by the output of gate 120, the contents of the six-stage BCD counter 122 is transferred to the storage register. The contents in the storage register, representing an accurate time difference measurement difference, is displayed in a digital display device, not shown.

What is claimed is:

1. A receiver for measuring the time difference of pulses from a least a pair of transmitting stations comprising a. first generator means responsive to each said pulse from a first of said transmitter stations for generating a timing trigger pulse phase-locked to the carrier of said pulses from said first transmitter station, b. second generator means responsive to each said pulse from the second of said transmitter stations for generating a timing trigger pulse phase-locked to the carrier of said pulses from said second transmitter station, c. means for measuring the time difference between selected timing trigger pulses from said first and second generator means, d. cycle identification means for comparing the time of occurence of said timing trigger pulses from said first and second generator means with a predetermined point on said received pulses from said first and second transmitter stations, respectively, and for indicating the relative position of said predetermined point and said timing trigger pulses, said cycle identification means comprising i. a first hard limiter means responsive to received pulses applied thereto for hard limiting said received pulses resulting in a first square wave output, said hard limiter being adapted to receive said received pulses from either said first or second transmitter stations, ii. an adder having first and second inputs and an output, said received pulses being applied to one of said inputs, iii. means for delaying said received pulses and applying them to the second of said adder inputs, whereby the adder output is a signal equal in frequency to said carrier frequency and having a point of phase reversal a fixed distance from the start of each said received pulse, iv. a second hard limiter connected to said adder output for hard limiting said adder output signal resulting in a second square wave, said second square wave differing from said first square wave in that phase reversal occurs at a predetermined point therein, v. first comparison means responsive to said first and second square waves for generating an output voltage having a first level when said first and second square waves are in phase and a second level when said first and second square waves are opposite in phase, and vi. time comparison means for detecting whether said selected timing trigger pulses lead, lag or are in substantial time coincidence with the point of level change in said comparison means output voltage, said selected timing trigger pulses being the ones generated in response to the same received pulses applied to said hard limiter.

2. A receiver as claimed in claim 1, wherein said time comparison means comprises an up/down counter of fixed capacity having a steering control input terminal and a count input terminal, said counter being of the type which counts each pulse applied to said count input terminal in a direction dependent upon the voltage level applied to said steering control input terminal and generates an overflow pulse when said fixed capacity is exceeded, means for applying the output of said first comparison means to said steering control terminal, means for applying an equal number of pulses to said count input terminal before and after said timing trigger pulse, and indicator means responsive to said overflow pulse and output from said first comparison means for indicating the direction in which the counter is counting when overflow occurs.

3. A receiver as claimed in claim 2, further comprising manual controlled selection means for selectively enabling said cycle identification means only during reception of pulses from a selected one of said transmitters.

4. A receiver as claimed in claim 3, wherein ssaid indicator means comprises a. a single shot multivibrator responsive to each said overflow pulse for generating a pulse of fixed duration, b. a sign flip-flop having steering inputs controlled by the output of said first comparison means and a triggering input connected to said overflow pulse output, c. integrating means for integrating said pulse from said single shot multivibrator in either a positive or negative direction in dependence upon the state of said sign flip-flop, and d. a meter connected to said integrator.

5. A receiver adapted to receive Loran-C pulses and provide an indication of the time difference of arrival of pulses received from a master transmitting station and pulses received from at least one slave transmitting station, wherein said received pulses all have the same carrier frequency and are transmitted in groups at a fixed group repetition interval and further wherein said group from said slave are transmitted a fixed time following the group from said master, said receiver comprising a. a master phase locked loop responsive to pulses received from said master station for generating at least one sample trigger pulse, ST3, per master received and phase-locking said sample trigger pulses to the carrier of said master received pulses, b. a first slave phase-locked loop responsive to pulses received from said slave station for generating at least one sample trigger pulse, ST3, per slave received pulse and phase-locking said sample trigger pulses to the carrier of said master received pulses, c. means for varying the time of generation of said master sample triggers to position said master sample triggers in substantial coincidence with a predetermined cycle of the corresponding master pulses, d. means for varying the time of generation of said slave sample triggers to position said slave sample triggers in substantial coincidence with said predetermined cycle of the corresponding slave pulses, and e. cycle identification means, selectably operable in said master or slave received pulses, for providing an indication when said sample triggers are not in coincidence with the said predetermined cycle of the corresponding received pulses, said cycle identification means comprising i. first hard limiter means for amplitude limiting signals applied thereto, said received pulses being applied to said first means thereby resulting in a square wave at said carrier frequency for each received pulse, ii. means responsive to each received pulse for generating a signal at said carrier frequency and having a point of phase reversal at said predetermined cycle, iii. second hard limiter means for amplitude limiting signals applied thereto, said last mentioned signals with phase reversal being applied to said second means, iv. phase comparator means responsive to the outputs from said first and second hard limiter means for generating a bilevel output signal having a first level when the outputs from said first and second hard limiter means are in phase and a second level when the outputs are out of phase, and v. detecting means responsive to said bilevel signals and selectively responsive to said sample trigger, ST3, from said master or slave phase locked loops for detecting if said detected sample triggers are not substantially in coincidence with the point of level change in said bilevel signals.

6. A receiver as claimed in claim 5, wherein said master phase-locked loop comprises a. phase shifter means connected to said phase detector for generating and controlling the phase of an output frequency in accordance with a command input applied thereto, b. repetition interval divider means responsive to said phase controlled output frequency for generating an output pulse once each fixed repetition interval, c. synchronizer means responsive to each said output pulse from said divider for generating said master sample triggers, and d. phase detector means responsive to said received master pulse carriers and said master sample triggers for detecting a phase difference between said pulse carrier and said sample trigger and for applying a command input to said phase shifter to cause phase shifting of said phase controlled output frequency in a direction to reduce said phase difference.

7. A receiver as claimed in claim 6, wherein said phase shifter means comprises
   a. a local oscillator for generating a local oscillator output wave form having a frequency $x$
   b. a first shift register having $n$ stages and $n$ output lines connected respectively to said $n$ stages,
   c. a second shift register having $n$ stages and $n$ output lines connected respectively to said $n$ stages,
   d. means responsive to said local oscillator output waveform for loading a bit into the low order stage of each said shift registers once each $n$ cycles of said local oscillator output waveform,
   e. means responsive to said local oscillator output waveform for shifting said bit in said first shift register once each cycle of said local oscillator output waveform during the positive or high portion of each said cycle, whereby each said output line of said first shift register carries a waveform of a frequency $x/n$, with waveforms carried by output lines connected to adjacent stages having a phase difference equal to the period of said local oscillator output waveform,
   f. means responsive to said local oscillator output waveform for shifting said bit in said second shift register once each cycle of said local oscillator output waveform during the negative or low portion of each said cycle, whereby each said output line of said second shift register carries a waveform of a frequency $x/n$, with waveforms carried by output lines connected to adjacent stages having a phase difference equal to the period of said local oscillator output waveform, and whereby output waveforms on output lines connected to corresponding stages of said first and second shift registers are separated in phase by one half cycle of said local oscillator output waveform, and
   g. selector means having $2n$ input terminals, connected respectively to said $2n$ output terminals from said first and second shift register, and one output terminal, responsive to said command input for selecting one of said waveforms on said $2n$ inputs and applying it to said output terminal.

8. A receiver as claimed in claim 7, wherein said local oscillator output waveform has a frequency of 10 MHz, and each of said first and second shift registers has five stages.

9. A receiver as claimed in claim 6, wherein the repetition interval of said transmitted pulses is defined by standard Loran-C BPRR and SPRR designations, said BPRR representing the basic interval in the tens of thousands of microseconds, said SPRR representing the specific interval in hundreds of microseconds, said SPRR representing the specific interval in hundreds of microseconds, repetition interval divider comprising
   a. counter means responsive to the output waveform from said phase shifter for counting impulses in said output waveform, and for generating an overflow pulse each time it recycles, said counter means having a normal cycle of 100,000 microseconds, and
   b. means responsive to said counter reaching a count corresponding to the BPRR minus one thousand microseconds for presetting said counter to a count corresponding to 99,X00 microseconds, where X is the SPRR designation.

10. A receiver as claimed in claim 8, wherein the repetition interval of said transmitted pulses is defined by standard Loran-C BPRR and SPRR designations, said repetition interval divider comprising
    a. counter means responsive to the output waveform from said phase shifter for counting impulses in said output waveform, and for generating an overflow pulse each time it recycles, said counter means having a normal cycle of 100,000 microseconds, and
    b. means responsive to said counter reaching a count corresponding to the BPRR minus one thousand microseconds for presetting said counter to a count corresponding to 99,X00 microseconds, where X is the SPRR designation.

11. A receiver as claimed in claim 10, wherein said counter means comprises,
    a. first means responsive to the output waveform from said phase shifter for generating a pulse train in which adjacent pulses are separated by 10 microseconds, and
    b. four decade counters connected in series to count from 0000 to 9999, said 10 microsecond pulses being applied to the count input of the first of said decade counters.

12. A receiver as claimed in claim 11, wherein said presetting means comprises
    a. BPRR switch means selectively connectable to one of a plurality of terminals, each terminal representing one of the standard BPRR designations,
    b. SPRR switch means selectively connectable to one of a plurality of terminals, each terminal representing one of the standard SPRR designations,
    c. encoding means connected to said BPRR switch means for generating a digital code dependent upon the terminal to which said BPRR switch is connected,
    d. preset pulse generating means connected to said encoding means and said third and fourth decade counters for generating a preset pulse in response to said third decade counter containing a count of nine and said fourth decade counter containing a count corresponding to said digital code,
    e. first presetting means responsive to said preset pulse for presetting said fourth decade counter to a count of nine, and
    f. second presetting means connected to said SPRR switch means and responsive to said preset pulse for presetting said second decade counter to a count dependent upon the terminal to which said SPRR switch is connected.

13. A receiver as claimed in claim 5, wherein said detecting means of said cycle identifier comprises
    a. a digital up/down counter for accumulating impulses applied to a count input terminal thereof in a direction dependent upon the level of a signal applied to a steering terminal thereof and for generating an overflow output pulse when said counter accumulates a predetermined number more impulses in one direction than another, b. means for connecting said bilevel output from said phase comparator to the steering terminal of said up/down counter,
c. means for applying an equal number of counting pulses to said count input terminal of said up/down counter just before and just after the time of occurrence of said sample triggers, ST3,
d. sign detecting means having first and second stable states, responsive to said bilevel signal and said up/down counter overflow pulse for assuming said first stable state if said overflow pulse is time coincident with the up level of said bilevel signal and for assuming said second stable state if said overflow pulse is time coincident with the down level of said bilevel signal,
e. capacitive storage means,
f. a pulse generator responsive to each overflow pulse from said up/down counter for generating a pulse of fixed duration,
g. first and second current charging means for applying current of opposite polarity, respectively, to said capacitive storage means, when enabled,
h. first enabling means connected to said pulse generator and said sign detecting means for enabling said first current charging means for the duration of said fixed duration pulse if said sign detecting means is in said first stable state,
i. second enabling means connected to said pulse generator and said sign detecting means for enabling said first current charging means for the duration of said fixed duration pulse if said sign detecting means is in said second stable state, and
j. indicator means for providing an indication of the polarity of the charge stored by said capacitive storage means.

14. A receiver as claimed in claim 12, wherein said detecting means of said cycle identifier comprises
a. a digital up/down counter for accumulating impulses applied to a count input terminal thereof in a direction dependent upon the level of a signal applied to a steering terminal thereof and for generating an overflow output pulse when the counter accumulates a predetermined number more impulses in one direction than another,
b. means for connecting said bilevel output from said phase comparator to the steering terminal of said up/down counter,
c. means for applying an equal number of counting pulses to said count input terminal of said up/down counter just before and just after the time of occurrence of said sample triggers, ST3,
d. sign detecting means having first and second stable states, responsive to said bilevel signal and said up/down counter overflow pulse for assuming said first stable state if said overflow pulse is time coincident with the up level of said bilevel signal and for assuming said second stable state if said overflow pulse is time coincident with the down level of said bilevel signal,
e. capacitive storage means,
f. a pulse generator responsive to each overflow pulse from said up/down counter for generating a pulse of fixed duration,
g. first and second current charging means for applying current of opposite polarity, respectively, to said capacitive storage means, when enabled,
h. first enabling means connected to said pulse generator and said sign detecting means for enabling said first current charging means for the duration of said fixed duration pulse if said sign detecting means is in said first stable state,
i. second enabling means connected to said pulse generator and said sign detecting means for enabling said first current charging means for the duration of said fixed duration pulse if said sign detecting means is in said second stable state, and
j. indicator means for providing an indication of the polarity of the charge stored by said capacitive storage means.

* * * * *